US012790144B2

(12) United States Patent
Lundeen et al.

(10) Patent No.: US 12,790,144 B2
(45) Date of Patent: Nov. 10, 2026

(54) SYSTEMS AND METHODS FOR LOADING AND UNLOADING BINS CONTAINING ITEMS

(71) Applicant: Ford Global Technologies, LLC, Dearborn, MI (US)

(72) Inventors: Kurt Michael Lundeen, Novi, MI (US); John Randolf Vincent, Livonia, MI (US); Sam Hoff, Hazel Park, MI (US); Timothy Mark Feldkamp, Ann Arbor, MI (US); Yifan Chen, Ann Arbor, MI (US)

( * ) Notice: Subject to any disclaimer, the term of this patent is extended or adjusted under 35 U.S.C. 154(b) by 637 days.

(21) Appl. No.: 18/451,246

(22) Filed: Aug. 17, 2023

(65) Prior Publication Data

US 2025/0058984 A1 Feb. 20, 2025

(51) Int. Cl.

*B65G 67/08* (2006.01)
*B65G 43/00* (2006.01)
*B65G 67/20* (2006.01)

(52) U.S. Cl.

CPC ............. *B65G 67/08* (2013.01); *B65G 43/00* (2013.01); *B65G 67/20* (2013.01); *B65G 2203/0291* (2013.01)

(58) Field of Classification Search

USPC .................................. 198/575, 461.1, 461.2

See application file for complete search history.

(56) References Cited

U.S. PATENT DOCUMENTS

| | | | | |
|---|---|---|---|---|
| 8,042,677 | B2 * | 10/2011 | Konig | B65G 43/10 198/572 |
| 9,953,287 | B1 | 4/2018 | McDonald, Jr. et al. | |
| 10,011,434 | B1 * | 7/2018 | Messina | B25J 5/007 |
| 10,048,697 | B1 * | 8/2018 | Theobald | G05D 1/0282 |
| 10,155,604 | B2 * | 12/2018 | Dörenberg | B65B 35/44 |
| 10,773,897 | B2 * | 9/2020 | Schroader | B65G 47/54 |
| 10,981,486 | B2 * | 4/2021 | Carpenter | B65G 67/08 |
| 10,990,910 | B2 | 4/2021 | Bischoff et al. | |
| 11,235,931 | B2 * | 2/2022 | Paterson, Jr. | B65G 1/1375 |
| 12,110,189 | B2 * | 10/2024 | Kiyokawa | B65G 1/1373 |

(Continued)

OTHER PUBLICATIONS

Ancra Systems BV, Technology Informaton: Autmotated Truck Loading Systems, Sep. 10, 2019, pp. 1-16.

(Continued)

*Primary Examiner* — Mark C Hageman

(74) *Attorney, Agent, or Firm* — Emily Campbell; Eversheds Sutherland (US) LLP

(57) ABSTRACT

A system including a conveyor lane, a transceiver and a processor is disclosed. The conveyor lane may be configured to move a bin from a first location to a second location. The second location may be in proximity to a motorized tile disposed in a vehicle interior portion. The motorized tile may be configured to receive the bin from the conveyor lane and move the bin to a predefined position in the vehicle interior portion. The transceiver may be configured to receive a wheel speed associated with the motorized tile. The processor may be configured to obtain a trigger signal, and obtain the wheel speed from the transceiver responsive to obtaining the trigger signal. The processor may be further configured to activate the conveyor lane to cause bin movement from the first location to the second location at a predefined speed responsive to obtaining the wheel speed.

20 Claims, 8 Drawing Sheets

(56) References Cited

U.S. PATENT DOCUMENTS

| | | | | |
|---|---|---|---|---|
| 12,195,275 | B2 * | 1/2025 | Eidsmore | B60P 1/36 |
| 12,214,969 | B2 * | 2/2025 | Pheng | B07C 5/36 |
| 12,280,964 | B2 * | 4/2025 | Diesner | B65G 47/31 |
| 2009/0065330 | A1 * | 3/2009 | Lupton | B65G 47/684 700/223 |
| 2013/0199133 | A1 | 8/2013 | Kluge et al. | |
| 2018/0194575 | A1 | 7/2018 | Anderson | |
| 2022/0168780 | A1 * | 6/2022 | Yang | B65G 43/08 |
| 2022/0169450 | A1 * | 6/2022 | Grupp | B65G 43/08 |

OTHER PUBLICATIONS

VPS, Best Practices for Warehouse Loading and Unloading, Dec. 17, 2022, pp. 1-6.

* cited by examiner

SYSTEMS AND METHODS FOR LOADING AND UNLOADING BINS CONTAINING ITEMS

FIELD

The present disclosure relates to systems and methods for loading and unloading bins containing items, such as packages, groceries, parts, etc.

BACKGROUND

With the continued growth of internet-based commerce, package delivery is increasingly used to deliver goods to customers. Specifically in the US, e-commerce business is expected to continue to grow in the years to come.

Unprecedented growth is received favorably by e-commerce companies; however the rapid growth also leads to operational challenges in the supply chain. E-commerce companies and their delivery partners deliver an ever-increasing number of packages per day, while trying to limit spend on resources (e.g., labor, etc.) and reduce delivery time.

Various approaches are currently used to optimize the process of loading/unloading delivery packages to/from a delivery vehicle. For example, E-commerce companies load packages with similar delivery addresses in proximity to each other in a delivery vehicle to gain efficiency in unloading packages. Further, E-commerce companies optimize delivery routes for their delivery vehicles to reduce energy consumption and package delivery time.

While conventional methods performed by the E-commerce companies are effective in gaining efficiency, there remain challenges that cause inconvenience to vehicle drivers and/or the E-commerce companies. For example, loading/unloading of delivery packages to/from a delivery vehicle in a warehouse is still a manual process, and hence requires resources that may be unavailable or expensive.

Thus, there exists a need for a system and method that facilitates autonomous loading/unloading of packages in/from a delivery vehicle.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
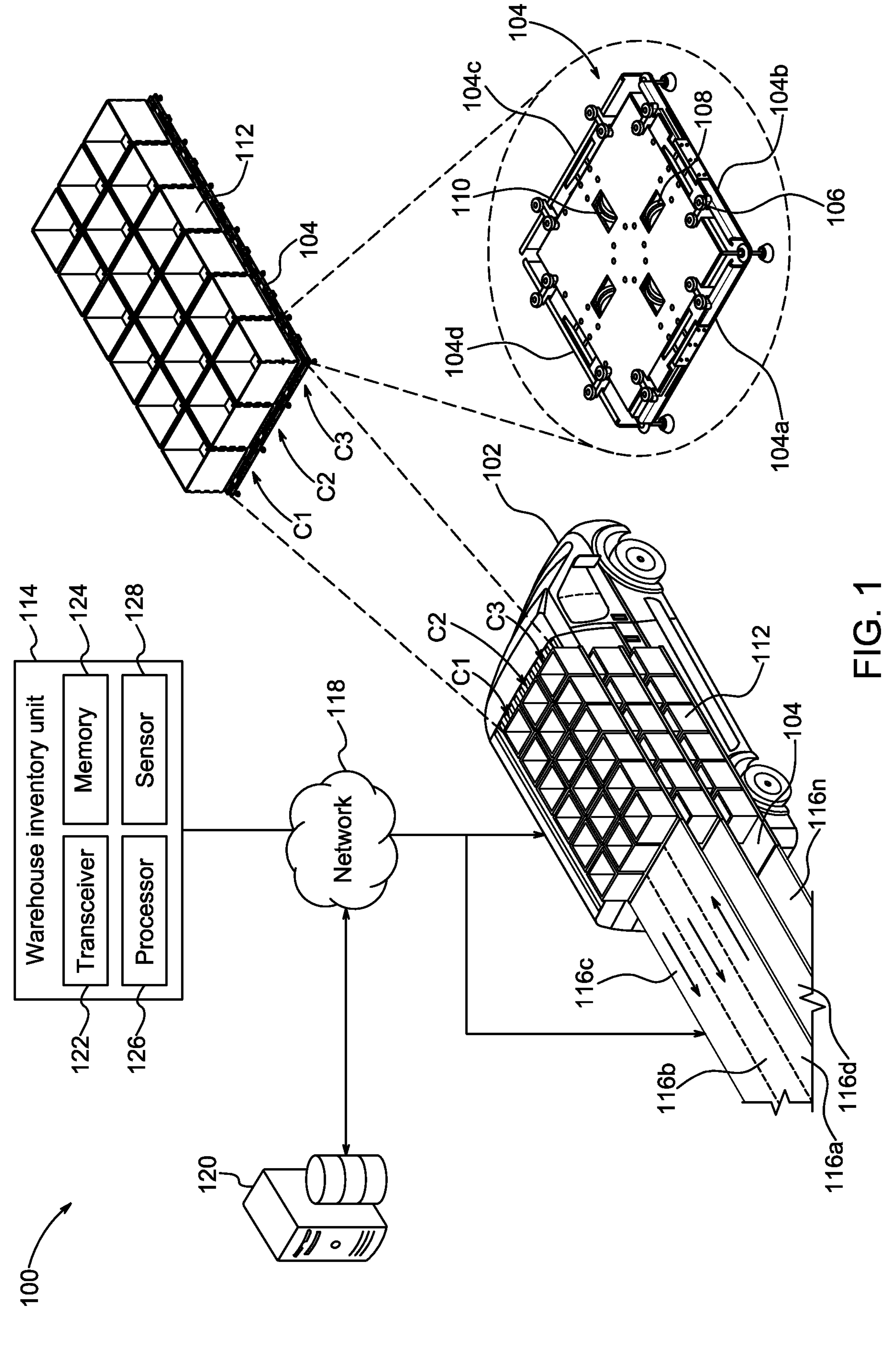
FIG. 1 depicts an example environment in which techniques and structures for providing the systems and methods disclosed herein may be implemented.

The present disclosure describes a warehouse management system and method for loading and unloading bins to/from a delivery vehicle in a warehouse or facility. Each bin may store one or more delivery packages that may be delivered to respective delivery locations by the delivery vehicle. In some aspects, the system may include a first conveyor belt configured to move bins from a bin packing area to the delivery vehicle. Specifically, the first conveyor belt may be configured to load bins including the delivery packages to the delivery vehicle. The system may further include a second conveyor belt configured to unload empty bins from the delivery vehicle.

In an exemplary aspect, when the delivery vehicle reaches the warehouse and may be disposed in proximity to the first and second conveyor belts, the system may activate the second conveyor belt to enable unloading of empty bins from the delivery vehicle. In some aspects, the delivery vehicle may include a plurality of motorized tiles on which the bins may be stored/secured. In some aspects, in addition to activating the second conveyor belt, the system may cause motorized tile movement in the delivery vehicle to cause movement of empty bins towards the second conveyor belt. Responsive to receiving the empty bins from the motorized tiles, the second conveyor belt may offload or unload the empty bins from the delivery vehicle and move the empty bins towards the bin packing area or an empty bin storage area in the warehouse.

Responsive to the empty bins being unloaded from the delivery vehicle, the system may activate the first conveyer belt to move bins packed with delivery packages from the bin packing area towards the delivery vehicle, to load the bins into the delivery vehicle. In some aspects, when the bins reach the delivery vehicle, the motorized tiles may receive the bins from the first conveyor belt and may move the bins to respective predefined storage locations in the vehicle interior portion.

In some aspects, the system may activate the first and second conveyor belts based on wheel speed of wheels included in the motorized tiles. In an exemplary aspect, the system may activate the first conveyor belt at a speed that may be less than or equivalent to the wheel speed, and the second conveyor belt at a speed that may be greater than or equivalent to the wheel speed. The system may activate the first and second conveyor belts are their respective speeds to ensure that the empty bins or the bins packed with delivery packages do not pile-up on the conveyor belts and/or the motorized tiles included in the delivery vehicle.

In further aspects, the system may include a bin staging area and a loading platform or loader that may be disposed in proximity to the delivery vehicle and the conveyor belts (e.g., bi-directional conveyor belts). The system may pre-store the bins packed with the delivery packages in the bin staging area. In some aspects, the bin staging area and the loader may include one or more motorized tiles that may enable bin movement within the bin staging area and the loader. In this case, when the delivery vehicle reaches in proximity the loader, the system may activate the plurality of motorized tiles included in the delivery vehicle to offload/unload the empty bins from the delivery vehicle by using the loader and the conveyor belts. The system may further activate the motorized tiles included in the bin staging area and the loader to move the bins packed with the delivery packages from the bin staging area to the delivery vehicle.

In additional aspects, the system may include one or more accumulators that may pre-store the bins to be loaded in the delivery vehicle, before the delivery vehicle arrives at the warehouse or is disposed in proximity the loader. In this case, the system may cause the bins stored in the accumulator to move towards the bin storage area, when the system determines that the delivery vehicle may have reached the warehouse for bin loading, or when the system determines that the bin storage area may be empty.

The present disclosure discloses a warehouse management system and method. The system enables autonomous loading and unloading of bins/delivery packages to/from a delivery vehicle, thus saving manual effort. Further, the system enables quick loading and unloading of bins/packages by using bin staging areas and loaders, thereby enhancing warehouse operational efficiency.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a delivery vehicle 102 (or vehicle 102) that may be a truck, a van (including walk-in vans), a truck trailer, and/or the like. In some aspects, the vehicle 102 may be an autonomous vehicle. In other aspects, a driver (not shown) may operate the vehicle 102. Further, the vehicle 102 may include any powertrain such as, for example, a gasoline engine, one or more electrically-actuated motor(s), a hybrid system, etc.

The vehicle 102 may include one or more layers or arrays of a plurality of motorized tiles 104 disposed in a vehicle interior portion. In the exemplary aspect depicted in FIG. 1, the vehicle 102 includes three arrays of the plurality of motorized tiles 104, which are disposed one over the other in the vehicle interior portion. The present disclosure is not limited to the aspect of the vehicle 102 having three arrays of the plurality of motorized tiles 104 as shown in FIG. 1. The vehicle 102 may include more or less than three arrays without departing from the present disclosure scope.

In an exemplary aspect, each motorized tile 104 may be rectangular or square in shape (as shown in FIG. 1), and may include four edges 104*a*, 104*b*, 104*c* and 104*d*. Each edge 104*a-d* may include one or more gates 106 that may be configured to move/slide along the lengths of respective edges 104*a-d*. Each motorized tile 104 may further include a first set of wheels 108 that may be configured to rotate in one direction (e.g., a first direction) and a second set of wheels 110 that may be configured to rotate in another direction (e.g., a second direction). In some aspects, the first direction may be perpendicular to the second direction. Further, in an exemplary aspect, a rotation speed of each wheel 108, 110 ("wheel speed") may be same.

Each motorized tile 104 may be configured to hold/store a bin 112, and/or move the bin 112 from one location to another in the vehicle interior portion by using the wheels 108 or 110 based on a command signal obtained from a vehicle processor (not shown). Specifically, responsive to receiving the command signal from the vehicle processor, one set of wheels from the first and second sets of wheels 108, 110 may rotate at a preset wheel speed, and the gates 106 on respective edges 104*a-d* may "slide away" from each other to position at the corners of the motorized tile 104. In this arrangement, when a bin 112 is placed on the motorized tile 104 or comes in contact with the moving wheels 108 or 110, the bin 112 may move on the motorized tile 104. For example, if the second wheels 110 are rotating in a clockwise direction and the bin 112 comes in contact with the rotating second wheels 110, the bin 112 may slide or move from the edge 104*a* towards the edge 104*c*. In this manner, responsive to receiving the command signal from the vehicle processor, the motorized tile 104 may enable bin movement on the motorized tile 104.

In further aspects, responsive to receiving another command signal from the vehicle processor, the motorized tile 104 may stop wheel movement (e.g., of the second wheels 110) and cause the gates 106 on respective edges 104*a-d* to slide towards each other. In this arrangement, the bin 112 may be stored on the motorized tile 104. In some aspects, in this arrangement, the gates 106 slide towards each other to prevent bin slippage from the motorized tile 104. Such an arrangement may be used when the bin 112 may be required to be transported or securely held in the vehicle 102.

Figure 3A:
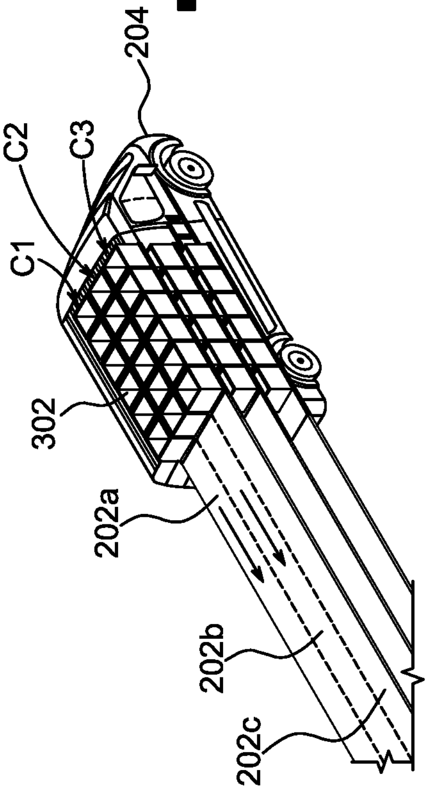
FIGS. 3A, 3B, 3C and 3D depict first example stages of loading and unloading bins in/from a delivery vehicle in accordance with the present disclosure.
Figure 3B:
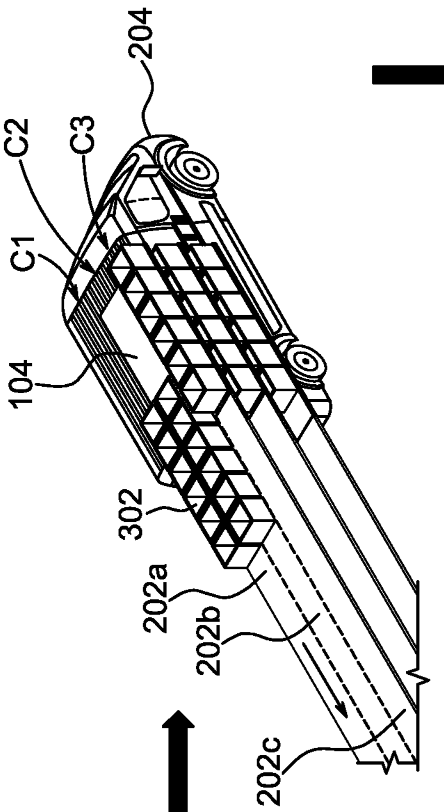
Figure 3C:
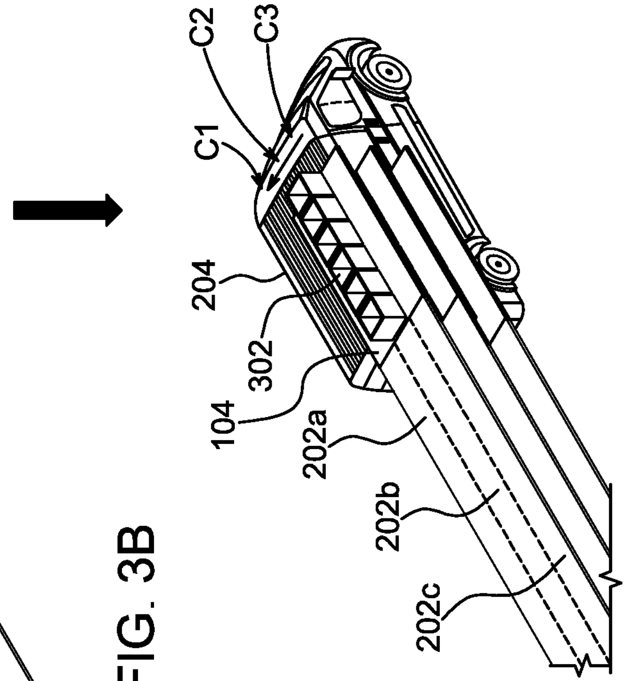
Figure 3D:
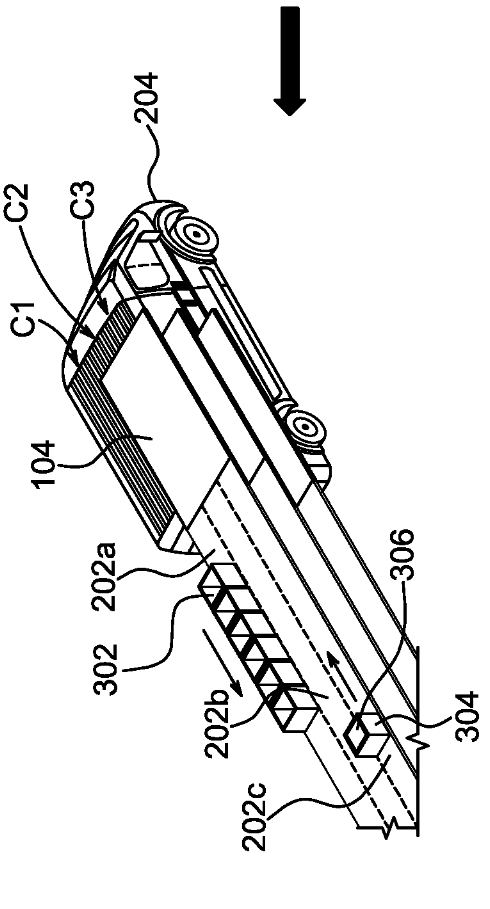

In some aspects, each bin 112 may be configured to hold one or more packages (shown as a delivery package 306 in FIG. 3D). In an exemplary aspect, location of each bin 112 in the vehicle 102 and allocation of each package in each bin 112 may be optimally pre-planned or preset such that unloading of each package from the vehicle 102 may be convenient (e.g., when the vehicle 102 reaches a package delivery location).

The environment 100 may further include a warehouse management system including a warehouse inventory unit 114 and one or more conveyor belts or lanes 116*a*, 116*b*, 116*c*, 116*d*, 116*n* communicatively coupled with each other via one or more network(s) 118. The network(s) 118 illustrates an example communication infrastructure in which the connected devices discussed in various embodiments of this disclosure may communicate. The network(s) 118 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, one set of conveyor belts, e.g., the conveyor belts 116*a*, 116*d* and 116*n*, may be configured to transport/move the bin 112 towards the plurality of motorized tiles 104, and another set of conveyor belts, e.g., the conveyor belts 116*b* and 116*c*, may be configured to transport/move the bin 112 away from the plurality of motorized tiles 104. Each conveyor belt 116*a-n* may include fences (made of low-friction material) or roller border to ensure stable and secure bin placement on the conveyor belts 116*a-n*.

In some aspects, a count of conveyor belts in the warehouse management system may depend on a count of arrays/layers of the plurality of motorized tiles 104 in the vehicle 102, and a count of columns of motorized tiles in each array. For example, as shown in FIG. 1, if the vehicle 102 includes three arrays and each array includes three columns of motorized tiles 104 (shown as C1, C2 and C3 in FIG. 1), the warehouse management system may include nine conveyor belts. Specifically, in this case, each column of each array may have an associated conveyor belt that may be configured to enable loading or unloading of bins to/from the motorized tiles 104 included in the column. For example, the conveyor belt 116*a* may be configured to transport and enable bin loading to the motorized tiles 104 included in the column C3, and the conveyor belts 116*b* and 116*c* may be configured to transport and enable bin unloading from the motorized tiles 104 included in the columns C1 and C2.

Although the description above describes an aspect where the vehicle 102 includes three arrays/layers of the motorized tiles 104 and each array includes three columns, the present disclosure is not limited to such an arrangement of motorized tiles 104. In other aspects, the vehicle 102 may include more or less arrays/layers and each array may include more or less than three columns, without departing from the present disclosure scope. In this case, the warehouse management system may include more or less than nine conveyor belts described above.

The warehouse inventory unit 114 may be configured to control activation and movement of each conveyor belt 116*a-n*. In some aspects, the warehouse inventory unit 114 may be communicatively coupled with the vehicle 102 and a server 120 via the network(s) 118. The warehouse inventory unit 114 may control conveyor belt activation and movement based on inputs received from the server 120 and/or the vehicle 102, as described later in detail in the description below.

In some aspects, the server 120 may be part of the warehouse management system. In other aspects, the server 120 may be separate from the warehouse management system. The server 120 may be associated with an E-commerce firm and/or firm's delivery partner, and may store information associated with the vehicle 102 (and other vehicles that may be part of a vehicle fleet), the bins 112 and the packages that may be stored in each bin 112. In an exemplary aspect, the information may include, but is not limited to, a count of arrays/layers of the plurality of motorized tiles 104 in the vehicle 102, a count of columns in each array/layer in the vehicle 102, wheel speed associated with each wheel 108, 110, a planned delivery route for the vehicle 102, identifiers and information (e.g., dimension, weight, etc.) associated with each bin 112 loaded or to be loaded in the vehicle 102, identifiers and information (e.g., dimension, weight, etc.) associated with each delivery package stored in each bin 112 loaded or to be loaded in the vehicle 102, optimized allocation of each delivery package in each bin 112, optimized location of each bin 112 in the arrays of the plurality of motorized tiles 104 in the vehicle 102, and/or the like. The server 120 may be configured to transmit the information described above to the warehouse inventory unit 114 at a predefined frequency via the network(s) 118.

In some aspects, the warehouse inventory unit 114 may include one or more units including, but not limited to, a transceiver 122, a memory 124, a processor 126 and a sensor 128. The transceiver 122 may be configured to receive information, data, notification, signals, etc. from one or more devices or systems external to the warehouse inventory unit 114. For example, the transceiver 122 may be configured to receive the information described above from the server 120, information/data from the vehicle 102, and/or the like. The transceiver 122 may be further configured to transmit information, data, notification, command signals, etc. to one or more devices or systems external to the warehouse inventory unit 114, e.g., to the server 120, the conveyor belts 116*a-n*, and/or the vehicle 102.

The processor 126 may be disposed in communication with one or more memory devices disposed in communication with the respective computing systems (e.g., the memory 124 and/or one or more external databases not shown in FIG. 1). The processor 126 may utilize the memory 124 to store programs in code and/or to store data for performing aspects in accordance with the disclosure. The memory 124 may be a non-transitory computer-readable storage medium or memory storing delivery package management program code or instructions. The memory 124 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.). In some aspects, the memory 124 may be additionally configured to store the information/data received by the transceiver 122 from the server 120 and/or the vehicle 102.

The sensor 128 may be disposed at one or more locations of a warehouse/facility at which the conveyor belts 116*a-n* may be located. The sensor 128 may include one or more proximity sensors that may be configured to detect presence of objects (e.g., the vehicle 102, the bin 112, etc.) in proximity to the sensor 128. In some aspects, the sensor 128 may be disposed in proximity to the conveyor belts 116*a-n* and may be configured to transmit a first trigger signal when the vehicle 102 may be disposed or arrives in proximity to the conveyor belts 116*a-n*. In additional aspects, the sensor 128 may be configured to transmit a second trigger signal when a bin (e.g., the bin 112) may be on the conveyor belt 116*a* and disposed in proximity to a motorized tile of the plurality of motorized tiles 104.

The processor 126 may be configured to control activation and movement of each conveyor belt 116*a-n* based on signals obtained from the sensor 128 and the information/data obtained from the server 120 and/or the vehicle 102, as described below in conjunction with FIGS. 2-7.

The vehicle 102 and the warehouse inventory unit 114 implement and/or perform operations, as described here in the present disclosure, in accordance with the owner manual and safety guidelines.

Figure 2:
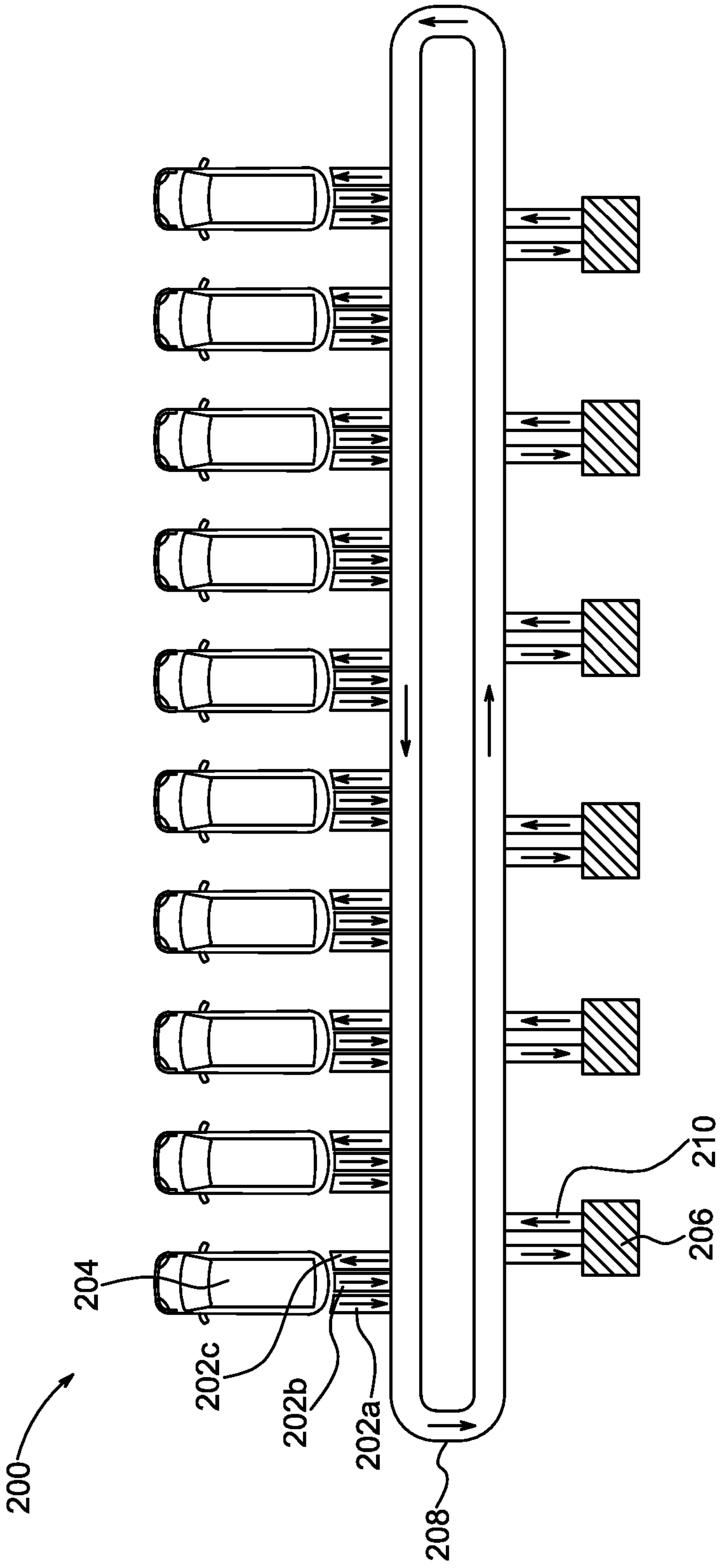
FIG. 2 depicts a first example arrangement of warehouse management system components in a warehouse in accordance with the present disclosure.

FIG. 2 depicts a first example arrangement of warehouse management system components in a warehouse 200 in accordance with the present disclosure. While describing FIG. 2, references may be made to FIGS. 3A, 3B, 3C and 3D.

As described above, the warehouse management system may include the warehouse inventory unit 114 (not shown in FIG. 2) and one or more conveyor belts 202*a*, 202*b*, 202*c*, etc. (also referred to herein as lanes 202*a*, 202*b*, 202*c*, etc.). The conveyor belts 202*a-c* may be same as the conveyor belts 116*a-n*. The conveyor belts 202*a-c* may be configured to transport the bins 112 towards or from the plurality of motorized tiles 104 of a vehicle 204, which may be same as the vehicle 102. In an exemplary aspect, the conveyor belt 202*c* may be configured to transport the bins 112 towards the plurality of motorized tiles 104 (i.e., towards the vehicle 204), and the conveyor belts 202*a*, 202*b* may be configured to transport the bins 112 from the plurality of motorized tiles 104 (i.e., from the vehicle 204). As depicted in FIG. 2, the warehouse 200 may be configured to load/unload the bins 112 in/from a plurality of vehicles simultaneously using a plurality of "sets" of conveyor belts. In the exemplary aspect shown in FIG. 2, each set of conveyor belts may include three conveyor belts (e.g., the conveyor belts 202*a-c*), and each set may be disposed in proximity to one vehicle (e.g., in proximity to loading and unloading area of each vehicle).

Although FIG. 2 depicts three conveyor belts in proximity to each vehicle (i.e., three conveyor belts in each set of conveyor belts), the present disclosure is not limited such an arrangement. In some aspects, a set of conveyor belts may include more or less than three conveyor belts.

The warehouse management system may further include one or more bin packing stations or areas 206 at which delivery packages may be loaded into each bin 112. In some aspects, delivery packages may be autonomously loaded into each bin 112 at the bin packing station 206 by using robots (not shown) based on command signals received from the warehouse inventory unit 114. Specifically, the processor 126 may use the information obtained from the server 120 (described above in conjunction with FIG. 1) to determine allocation of each delivery package in each bin 112, and may accordingly command the robots to load the delivery packages into the bins 112 based on the allocation.

The warehouse management system may additionally include a main conveyor belt 208 that may transport the bins 112 (into which the delivery packages may be loaded) from the bin packing station 206 to the vehicle 204 (and other vehicles located in the warehouse 200), and transport empty bins from the vehicle 204 to the bin packing station 206. Specifically, when the bins 112 for the vehicle 204 may be loaded with the delivery packages at the bin packing station 206, the processor 126 may command a packing station belt 210 to move the bins 112 from the bin packing station 206 to the main conveyor belt 208. Responsive to the main conveyor belt 208 receiving the bins 112 from the packing station belt 210, the processor 126 may command the main conveyor belt 208 to move the bins 112 towards the conveyor belt 202*c*, which may transport the bins 112 towards the vehicle 204. In some aspects, the main conveyor belt 208 may include diverters (not shown) that may be used to divert the bins 112 to the appropriate destination vehicle (e.g., the vehicle 204) or the conveyor belt (e.g., the conveyor belt 202*c*).

In operation, when the vehicle 204 reaches the warehouse 200 to unload empty bins 302 (as shown in FIG. 3A) and load the bins 112 with delivery packages, the vehicle 204 may park in proximity to the conveyor belts 202*a-c*. Specifically, the vehicle 204 may be disposed in such an arrangement that vehicle's loading/unloading area may be adjacent to or touching the conveyor belts 202*a-c*, as shown in FIG. 3A. In the exemplary aspect depicted in FIG. 3A, the vehicle 204 may unload or load bins via a vehicle rear portion. In other aspects (not shown), the vehicle 204 may unload or load bins via a vehicle side portion.

Responsive to the vehicle 204 reaching or being in proximity to the conveyor belts 202*a-c* as shown in FIG. 3A, the sensor 128 may detect vehicle presence in the proximity to the conveyor belts 202*a-c* and transmit the first trigger signal to the server 120 or directly to the processor 126. The processor 126 may obtain the first trigger signal from the server 120 (or directly from the sensor 128), and may obtain the wheel speed of each wheel 108, 110 of the plurality of motorized tiles 104 disposed in the vehicle 204 responsive to obtaining the first trigger signal. The processor 126 may obtain the wheel speed from the information stored in the memory 124 or the server 120, or may obtain the wheel speed directly from the vehicle 204 (e.g., via the transceiver 122).

Responsive to obtaining the wheel speed, the processor 126 may activate the conveyor belts 202*a* and 202*b*. The processor 126 may further transmit, via the transceiver 122, a command signal (e.g., a first command signal) to the vehicle 204 to cause activation and movement of the motorized tiles 104 included in the columns C1 and C2. The motorized tiles 104 included in the columns C1 and C2 may be activated in such a manner that the vacant bins 302 included in the columns C1 and C2 may move towards the conveyor belts 202*a* and 202*b*, as shown in FIG. 3B. Specifically, the wheels 108 or 110 may be activated to move the vacant bins 302 included in the columns C1 and C2 towards the conveyor belts 202*a* and 202*b*.

When the conveyor belts 202*a* and 202*b* receive the vacant bins 302 included in the columns C1 and C2 at an intersection point (or a "first location") of the conveyor belts 202*a*, 202*b* (and 202*c*) and the motorized tiles 104, the conveyor belts 202*a* and 202*b* may start to transport the vacant bins 302 towards a second location. In some aspects, the second location may be the bin packing station 206, at which the vacant bins 302 may be stored and loaded again (e.g., for another vehicle's delivery). In other aspects, the second location may be any other location in the warehouse 200 at which the vacant bins 302 may be stored.

In some aspects, the processor 126 may activate the conveyor belts 202*a* and 202*b* to move at a first speed, which may be based on the wheel speed obtained from the server 120 or the vehicle 204. In an exemplary aspect, the first speed may be greater than or equivalent to the wheel speed. The processor 126 activates the conveyor belts 202*a* and 202*b* to move at a speed greater than or equivalent to the wheel speed to ensure that the rate at which the vacant bins 302 are transported off the conveyor belts 202*a* and 202*b* is greater than or equal to the rate at which the vacant bins 302 may be received from the motorized tiles 104 at the intersection point or the first location. This may ensure that the vacant bins 302 do not pile-up at the intersection point or the first location.

When the vacant bins 302 included in the columns C1 and C2 may be completely offloaded or unloaded from the vehicle 204, the processor 126 may transmit another command signal (e.g., a second command signal, via the transceiver 122) to the vehicle 204 to cause activation and movement of the motorized tiles 104 included in the column C3. The motorized tiles 104 included in the column C3 may be activated in such a manner that the vacant bins 302 included in the column C3 may move towards the motorized tiles 104 included in the columns C1 or C2, as shown in FIG. 3C.

Responsive to the vacant bins 302 included in the column C3 being moved to the motorized tiles 104 included in the columns C1 or C2, the vacant bins 302 may be unloaded to the conveyor belts 202*a* and 202*b*, as shown in FIG. 3D.

In further aspects, responsive to all the vacant bins 302 in the vehicle 204 being unloaded, the processor 126 may activate the conveyor belt 202*c* to cause movement of a bin 304 loaded with a delivery package 306 from the second location towards the first location (i.e., the intersection point of the conveyor belts 202*a*, 202*b*, 202*c* and the motorized tiles 104). In some aspects, the second location may be the bin packing station 206 at which the bin 304 may be loaded with the delivery package 306. The conveyor belt 202*c* may be configured to move the bin 304 from the bin packing station 206 towards the first location (e.g., via the main conveyor belt 208 and the packing station belt 210, as described above).

Responsive to the bin 304 being in proximity to the first location, the sensor 128 may detect the presence of the bin 304. In this case, the sensor 128 may be disposed on the conveyor belt 202*c* in proximity to the first location. Responsive to detecting the bin presence in proximity to the first location, the sensor 128 may transmit a second trigger signal to the server 120 or directly to the processor 126. The processor 126 may obtain the second trigger signal from the server 120 or directly from the sensor 128, and determine the bin presence in proximity to the first location based on the second trigger signal.

Responsive to determining the bin presence in proximity to the first location, the processor 126 may transmit, via the transceiver 122, a command signal to the vehicle 204 to cause activation of the motorized tiles 104 included in the column C3. The motorized tiles 104 included in the column C3 may be activated such that the motorized tiles 104 included in the column C3 may receive the bin 304 from the conveyor belt 202*c*. Responsive to receiving the bin 304, the motorized tiles 104 included in the column C3 may be configured to move the bin 304 to a predetermined location on one of the motorized tiles 104 included in the columns C1, C2 or C3, based on the command signal obtained from the processor 126. Specifically, when the bin 304 reaches the first location or when the bin 304 is on the motorized tiles 104 included in the column C3, the processor 126 may use the information obtained from the server 120 to determine a predefined optimized position of the bin 304 in the vehicle interior portion. Responsive to determining the predefined optimized position, the processor 126 may transmit, via the transceiver 122, another command signal to the vehicle 204 to cause movement of the motorized tiles 104 included in the columns C1, C2 and/or C3 to move the bin 304 to the predefined optimized position. In a similar manner, a plurality of bins including delivery packages may be autonomously loaded into the vehicle 204 by using the warehouse management system. In some aspects, responsive to the plurality of bins being loaded into the vehicle 204, the processor 126 may transmit the information obtained from the server 120 (specifically, the information associated with the bins loaded in the vehicle 204 and the delivery packages stored in each bin) to the vehicle 204, for local storage purpose.

In some aspects, the processor 126 may activate the conveyor belt 202*c* to cause movement of the bin 304 from the second location towards the first location at a second speed. The second speed may be based on the wheel speed. In an exemplary aspect, the second speed may be less than or equivalent to the wheel speed. The processor 126 activates the conveyor belt 202*c* to move at a speed lesser than or equivalent to the wheel speed to ensure that the rate at which the packed bins (e.g., the bin 304) are transported to the first location is lesser than or equivalent to the rate at which the packed bins may be "picked" by the motorized tiles 104 included in the column C3. This may ensure that the packed bins do not pile-up at the first location.

Figure 4:
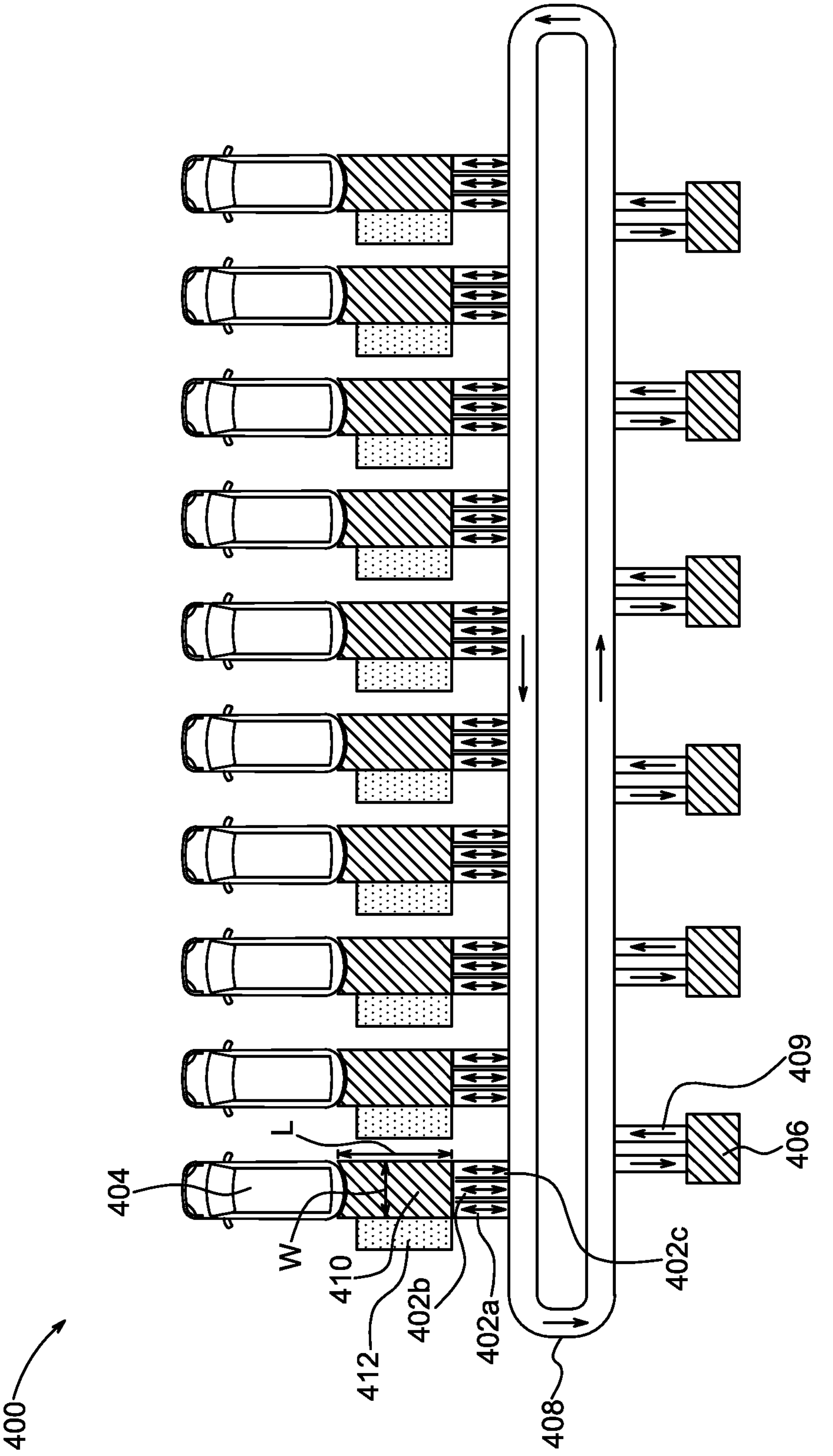
FIG. 4 depicts a second example arrangement of warehouse management system components in a warehouse in accordance with the present disclosure.

FIG. 4 depicts a second example arrangement of warehouse management system components in a warehouse 400 in accordance with the present disclosure. The warehouse 400 may be same as or similar to the warehouse 200 described above. While describing FIG. 4, references may be made to FIGS. 5A, 5B, 5C and 5D.

The warehouse 400 may include one or more conveyor belts 402*a*, 402*b*, 402*c*, etc. that may be configured to transport the bins 112 towards or from the plurality of motorized tiles 104 of a vehicle 404. The conveyor belts 402*a-c* may be similar to the conveyor belts 202*a-c*, and the vehicle 404 may be same as the vehicle 204. In some aspects, the conveyor belts 402*a-c* may be bi-directional. Stated another way, each conveyor belt 402*a-c* may be configured to transport the bins 112 to and from the vehicle 404. The warehouse 400 may further include one or more bin packing stations or areas 406, a main conveyor belt 408 and a packing station belt 409. The bin packing station 406 may be same as the bin packing station 206, the main conveyor belt 408 may be same as the main conveyor belt 208 and the packing station belt 409 may be same the packing station belt 210.

The warehouse 400 may further include one or more loaders 410. Each loader 410 may be disposed between the conveyor belts 402*a-c* and the loading and unloading area of each vehicle 404. In some aspects, the loader 410 may be part of the conveyor belts 402*a-c*. In other aspects, the loader 410 may be separate from the conveyor belts 402*a-c*. In an exemplary aspect, each loader 410 may include a plurality of motorized tiles (same as the motorized tiles 104 described above) that may be configured to move the bins 112 on the loader 410 in a first direction (e.g., along a loader length "L" towards the vehicle 204) or a second direction (e.g., along a loader width "W"). Loader dimensions (e.g., the length "L" and the width "W") may depend on warehouse dimensions.

The warehouse 400 may further include one or more bin staging areas 412 that may be disposed adjacent to the loaders 410 and in proximity to the first location described above. In an exemplary aspect, dimensions of each bin staging area 412 may be similar to the loader dimensions. Each bin staging area 412 may be configured to pre-store a plurality of pre-packaged bins 502 (as shown in FIG. 5A) in a pre-planned or pre-determined arrangement such that the bins 502 may be conveniently loaded into the vehicle 404. Each bin 502 may include one or more delivery packages 504 for the vehicle 404. In some aspects, the bins 502 may be stored at the bin staging area 412 before or when the vehicle 404 arrives at the warehouse 400 for loading/unloading, to optimize time required for loading the bins 502 into the vehicle 404. In some aspects, similar to the loaders 410, each bin staging area 412 may also include a plurality of motorized tiles that may enable the bins 502 to move on the bin staging area 412.

Although the description above describes that the bins 502 may be stored in a pre-determined arrangement in the bin staging area 412, in some aspects, the bins 502 may be sorted or moved within the bin staging area 412 by using the motorized tiles to optimize bin storage.

In operation, when the vehicle 404 arrives at the warehouse 400 to unload the empty bins 302 and load the bins 502, the vehicle 404 may park in proximity to the loader 410, as shown in FIG. 5A. Responsive to the vehicle 404 being in proximity to the loader 410, the sensor 128 may detect the vehicle presence and may transmit the first trigger signal to the processor 126. Responsive to obtaining the first trigger signal, the processor 126 may transmit, via the transceiver 122, a command signal to the loader 410 to activate the motorized tiles included in the loader 410, and another command signal to the conveyor belts 402*a-c* to activate the conveyor belt movement. The motorized tiles included in the loader 410 and the conveyor belts 402*a-c* may be activated such that any bin that may be placed on the loader 410 or the conveyor belts 402*a-c* may move away from the vehicle 404. In addition, the processor 126 may transmit, via the transceiver 122, a command signal to the vehicle 404 to cause activation and movement of the motorized tiles 104. The motorized tiles 104 may be activated such that the bins 302 may move towards the loader 410.

Figure 5B:
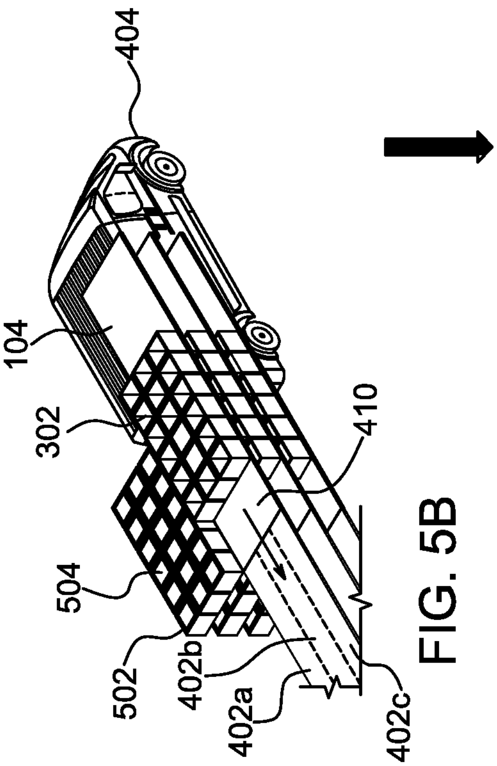
FIGS. 5A, 5B, 5C and 5D depict second example stages of loading and unloading bins in/from a delivery vehicle in accordance with the present disclosure.

Responsive to activating the loader 410, the conveyor belts 402*a-c* and the motorized tiles 104 as described above, the bins 302 may get offloaded or unloaded from the vehicle 404, as shown in FIG. 5B. In this case, the conveyor belts 402*a-c* may transport the bins 302 to the bin packing station 406, via the main conveyor belt 408 and the packing station belt 409.

Figure 5C:
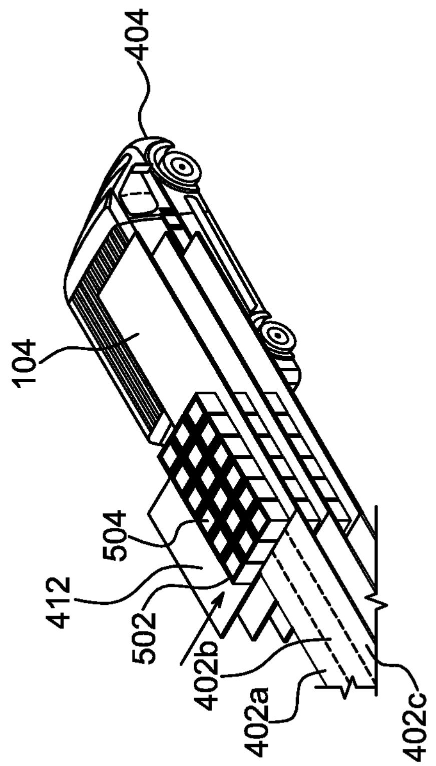
Figure 5A:
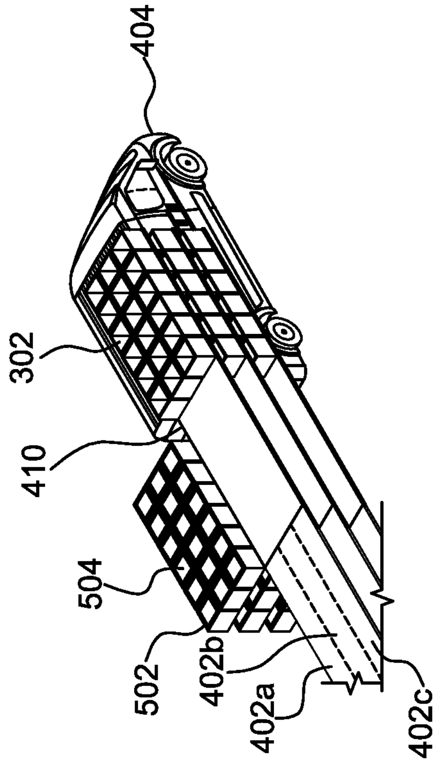

When all the bins 302 may be unloaded from the vehicle 404, the processor 126 may transmit, via the transceiver 122, another command signal to the loader 410 and the bin staging area 412 to cause activation of motorized tiles included in the loader 410 and the bin staging area 412. In some aspects, the motorized tiles included in the loader 410 and the bin staging area 412 may be activated such that the bins 502 may move from the bin staging area 412 to the loader 410, as shown in FIG. 5C. Specifically, the motorized tiles included in the bin staging area 412 may transport the bins 502 towards the motorized tiles included in the loader 410.

Figure 5D:
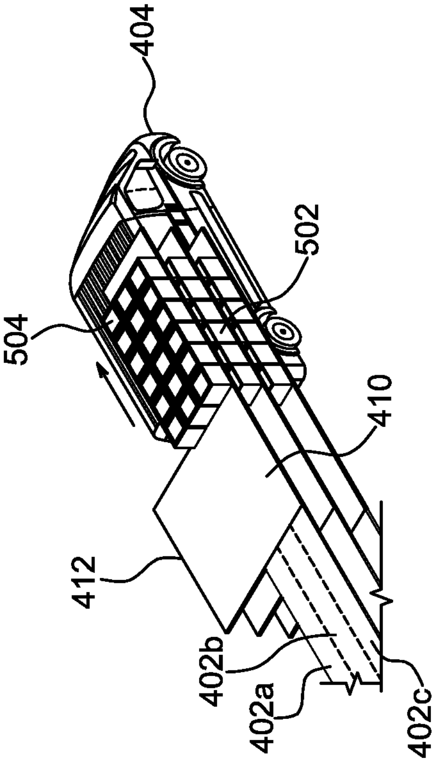

When all the bins 502 may be received by the motorized tiles included in the loader 410, the processor 126 may transmit, via the transceiver 122, another command signal to the loader 410 to enable bin movement towards the motorized tiles 104 (or the first location described above in conjunction with FIG. 2). Specifically, responsive to receiving the command signal from the processor 126, the loader 410 may activate the movement of the motorized tiles included in the loader 410 such that the bins 502 may move towards the vehicle 404, as shown in FIG. 5D.

In this manner, by pre-storing the packed bins 502 in the bin staging area 412, the warehouse management system enables quick bin loading into the vehicle 404.

FIGS. 6A, 6B, 6C and 6D depict example stages of loading and unloading bins in/from a delivery vehicle 602 in accordance with the present disclosure. FIGS. 6A-6D specifically depict an example scenario of loading and unloading bins when the warehouse 400 may not include the loader 410 and/or the bin staging area 412.

Figure 6A:
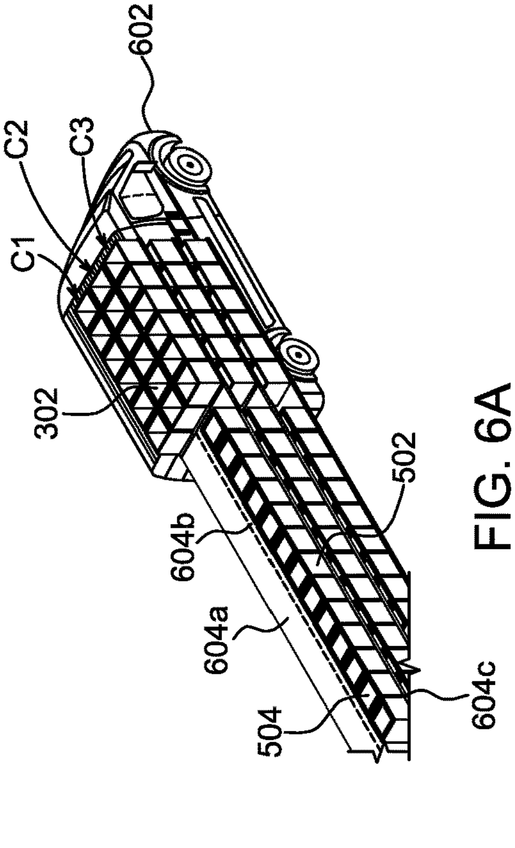
FIGS. 6A, 6B, 6C and 6D depict third example stages of loading and unloading bins in/from a delivery vehicle in accordance with the present disclosure.

In the exemplary aspect depicted in FIG. 6A, when the vehicle 602 arrives at the warehouse (e.g., the warehouse 400) to unload the empty bins 302 and load the bins 502, the vehicle 602 may park in proximity to the conveyor belts 604*a-c*. The conveyor belts 604*a-c* may be same the conveyor belts 202*a-c*. In some aspects, the conveyor belt 604*c* may be configured to transport the bins 502 towards the vehicle 602. Further, the conveyor belt 604*c* may pre-store the bins 502 before or when the vehicle 602 arrives at the warehouse 400.

Responsive to the vehicle 602 reaching in proximity to the conveyor belts 604*a-c*, the sensor 128 may detect the vehicle presence and may transmit the first trigger signal to the processor 126. Responsive to obtaining the first trigger signal, the processor 126 may transmit, via the transceiver 122, a command signal to the conveyor belts 604*a*, 604*b* to activate the conveyor belt movement. The conveyor belts 604*a*, 604*b* may be activated such that any bin that may be placed on the conveyor belts 604*a*, 604*b* may move away from the vehicle 602. In addition, the processor 126 may transmit, via the transceiver 122, another command signal to the vehicle 602 to cause activation of the motorized tiles 104 included in the columns C1 and C2. The motorized tiles 104 included in the columns C1 and C2 may be activated such that the bins 302 may move towards the conveyor belts 604*a*, 604*b*.

Figure 6B:
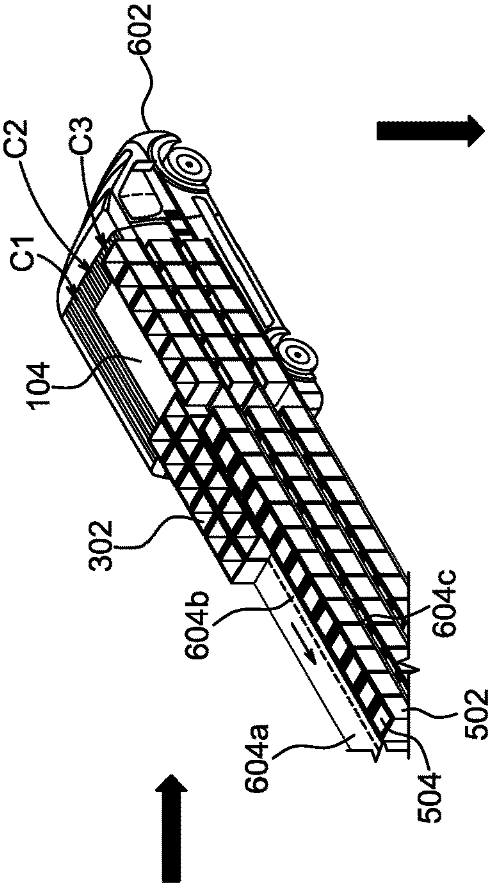
Figure 6C:
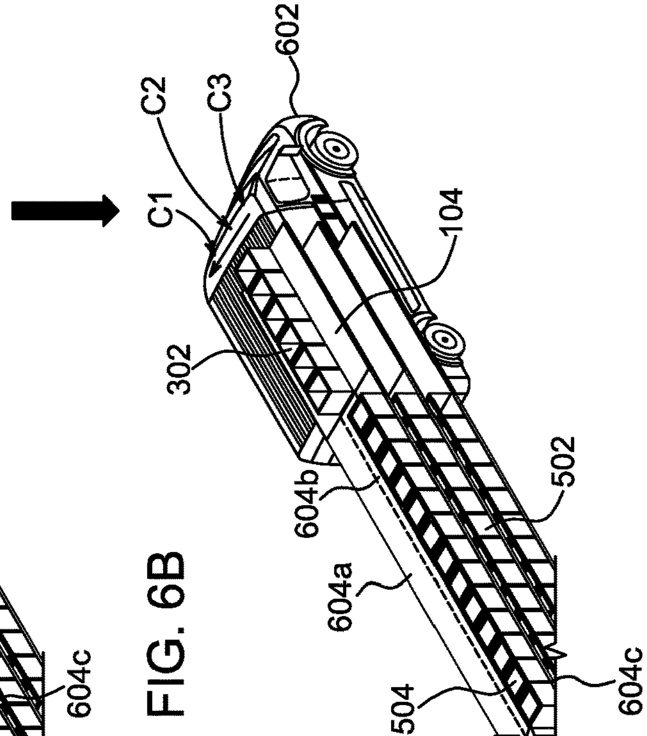
Figure 6D:
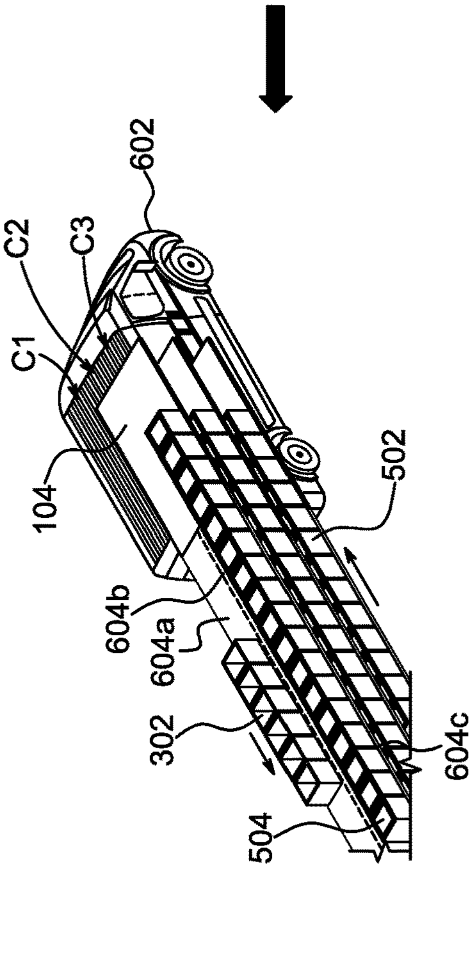

Responsive to activation of the conveyor belts 604*a*, 604*b* and the motorized tiles 104 included in the columns C1 and C2, the bins 302 may move away from the vehicle 404 on the conveyor belts 604*a*, 604*b*, as shown in FIG. 6B. When the bins 302 disposed on the columns C1 and C2 may be completely offloaded or unloaded from the vehicle 602, the processor 126 may transmit, via the transceiver 122, a command signal to the vehicle 602 to cause activation of the motorized tiles 104 included in the column C3. The motorized tiles 104 included in the column C3 may be activated such that the bins 302 disposed on the column C3 may move towards the column C1 or C2, as shown in FIG. 6C. When the bins 302 may be disposed on the column C1 or C2, the processor 126 may cause the motorized tiles 104 included in the column C1 or C2 to move the bins 302 away from the vehicle 602 towards the conveyor belts 604*a*, 604*b*, as shown in FIG. 6D. In addition, the processor 126 may transmit, via the transceiver 122, a command signal to the conveyor belt 604*c* for activation. Responsive to being activated, the conveyor belt 604*c* may move the bins 502 towards the vehicle 602. The motorized tiles 104 included in the columns C1, C2 and C3 may move the bins 502 to respective pre-determined optimal positions in the vehicle interior portion, as described above.

A person ordinarily skilled in the art may appreciate that the aspect depicted in FIGS. 6A-6D enables quick bin loading in the vehicle 602, without requiring the loader 410 and/or the bin staging area 412.

Figure 7:
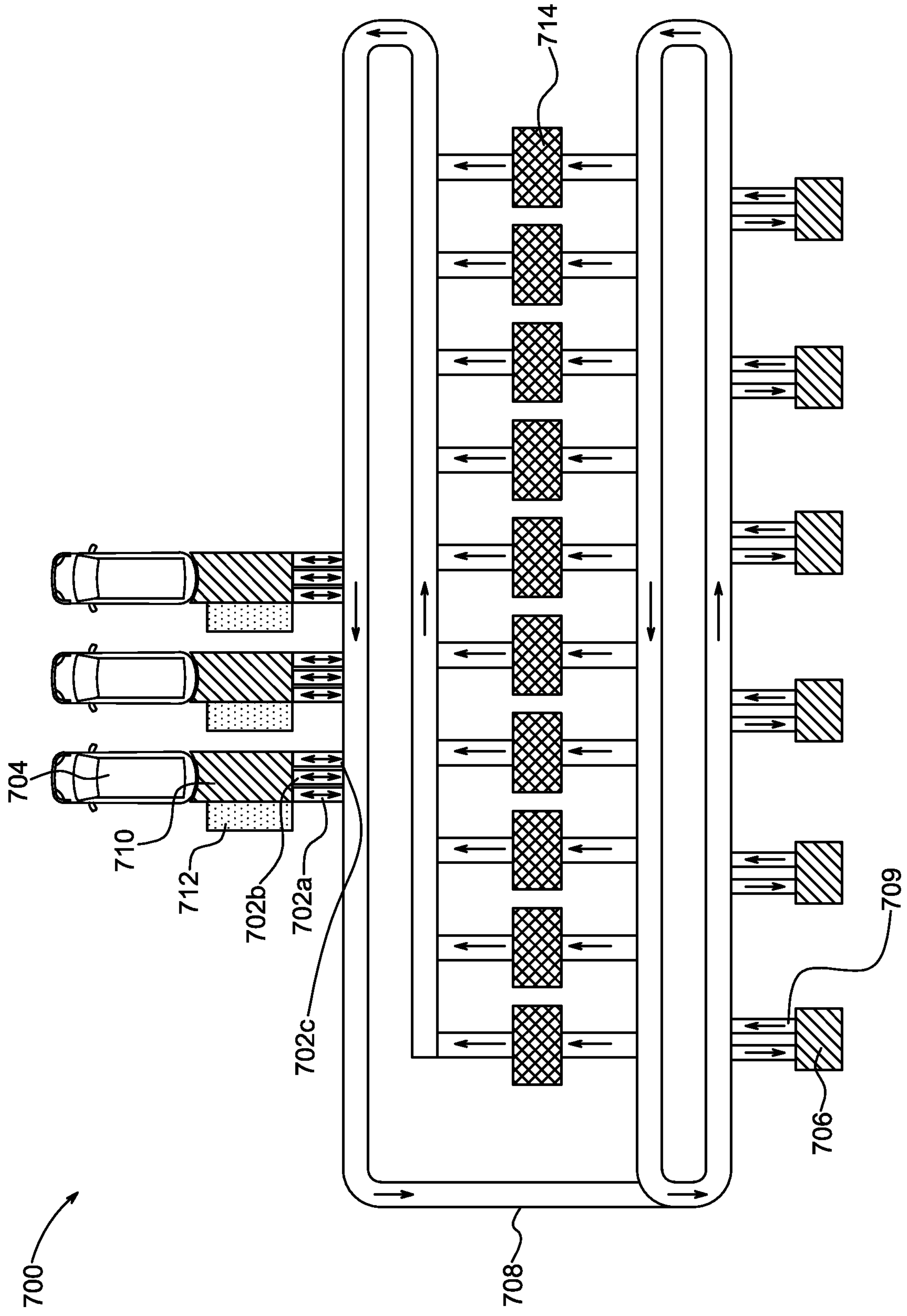
FIG. 7 depicts a third example arrangement of warehouse management system components in a warehouse in accordance with the present disclosure.

FIG. 7 depicts a third example arrangement of warehouse management system components in a warehouse 700 in accordance with the present disclosure. The warehouse 700 may be similar to the warehouse 200 or 400.

The warehouse 700 may include one or more conveyor belts 702*a*, 702*b*, 702*c*, etc. that may be configured to transport the bins 112 towards or from the plurality of motorized tiles 104 of a vehicle 704. The conveyor belts 702*a-c* may be same as the conveyor belts 402*a-c*, and the vehicle 704 may be same as the vehicle 404. The warehouse 700 may further include one or more bin packing stations or areas 706, a main conveyor belt 708, packing station belts 709, loaders 710 and bin staging areas 712. The bin packing station 706 may be same as the bin packing station 406, the main conveyor belt 708 may be same as the main conveyor belt 408, the packing station belts 709 may be same as the packing station belts 409, the loaders 710 may be same as the loaders 410, and the bin staging areas 712 may be same as the bin staging areas 412. In some aspects, a count of loaders 710 and bin staging areas 712 included in the warehouse 700 may be less than a count of loaders 410 and bin staging areas 412 included in the warehouse 400.

In some aspects, the warehouse 700 may further include one or more accumulators 714 that may be configured to pre-store the bins to be loaded in the vehicle 704 (and other vehicles in the warehouse 700), before or when the vehicle 704 arrives at the warehouse 700. Each accumulator 714 may include a plurality of motorized tiles that may enable the accumulator 714 to move the bins (e.g., the bins 112) stored on the accumulator 714 based on command signals received from the processor 126. In operation, when the vehicle 704 arrives at the warehouse 700, the processor 126 may transmit, via the transceiver 122, a command signal to the accumulator 714 (and the main conveyor belt 708, the conveyor belts 702*a-c*, the loader 710 and the bin staging area 712) to cause bin movement from the accumulator 714 to the bin staging area 712. When the vehicle 704 reaches in proximity to the loader 710, the bins 112 stored in the bin staging area 712 may be loaded into the vehicle 704 via the loader 710, as described above in conjunction with FIG. 4 and FIGS. 5A-5D.

In some aspects, the processor 126 may cause the accumulator 714 to send another set of bins to the bin staging area 712/loader 710 for another vehicle in queue for loading at the bin staging area 712/loader 710, when the processor 126 determines that the loader 710 may have loaded the bins 112 to the vehicle 704.

By pre-storing the bins 112 in the accumulator before the vehicle 704 arrives at the loader 710, the warehouse management system enables quick and seamless loading and unloading of bins to/from the vehicle 704.

Figure 8:
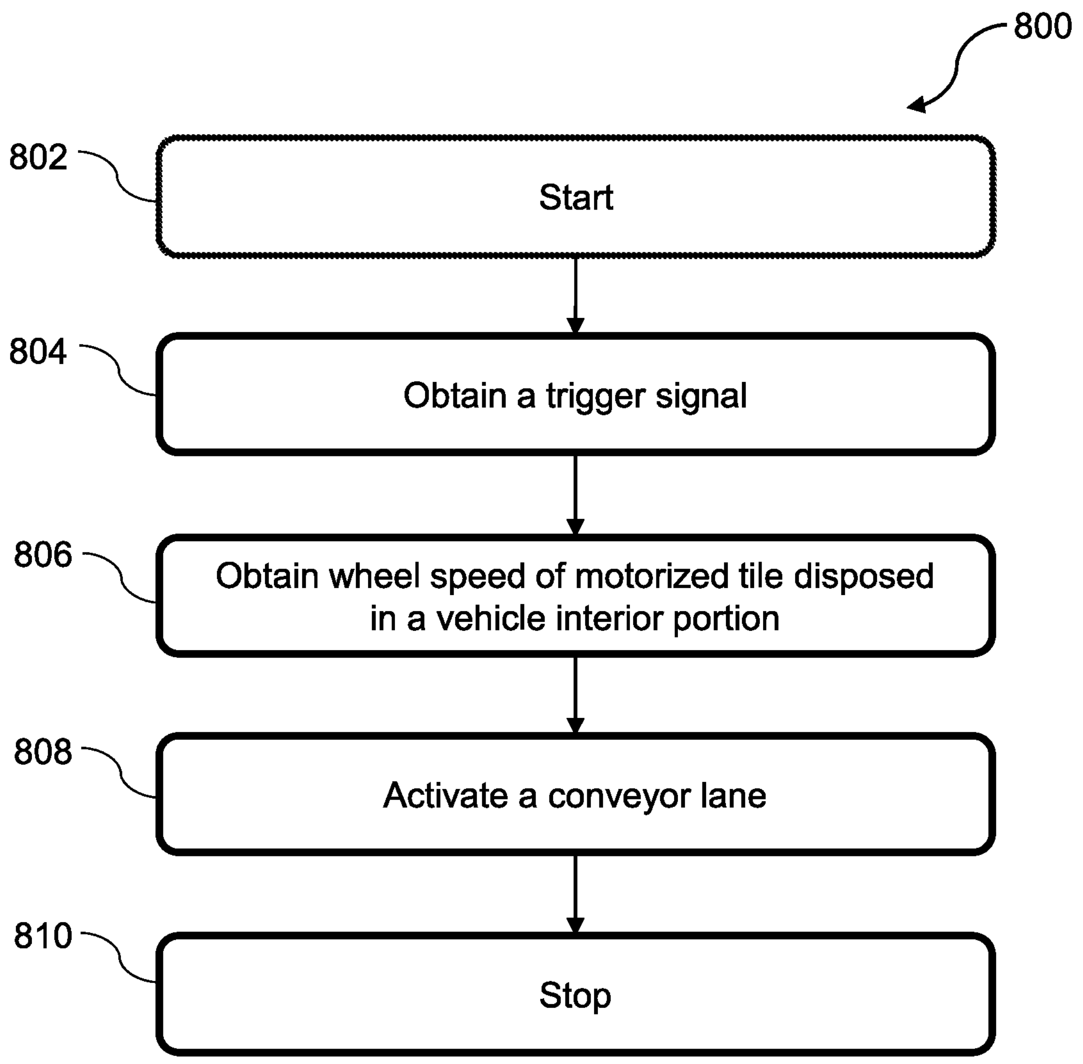
FIG. 8 depicts a flow diagram of an example method for facilitating loading and unloading of bins in accordance with the present disclosure.

FIG. 8 depicts a flow diagram of an example method 800 for facilitating loading and unloading of bins in accordance with the present disclosure. FIG. 8 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 800 starts at step 802. At step 804, the method 800 may include obtaining, by the processor 126, the first trigger signal from the server 120 or the sensor 128. As described above, the processor 126 obtains the first trigger signal when the vehicle 204 may be in proximity to the conveyor belts 202*a-c*. At step 806, the method 800 may include obtaining, by the processor 126, the wheel speed of each wheel 108, 110 of the plurality of motorized tiles 104 disposed in the vehicle 204 responsive to obtaining the first trigger signal. In some aspects, the processor 126 may obtain the wheel speed from the server 120 or the vehicle 204.

At step 808, the method 800 may include activating, by the processor 126, the conveyor belt 202*c* to load the bin 304 in the vehicle 204. As described above, the processor 126 may activate the conveyor belt 202*c* at the second speed, which may be less than or equivalent to the wheel speed.

The method 800 ends at step 810.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system for loading bins on and unloading bins from package delivery vehicles at a warehouse, the system comprising:

a first conveyor lane configured to move a first bin from a first location to a second location, wherein the second location is in proximity to a first motorized tile of an array of motorized tiles disposed in an interior portion of a package delivery vehicle temporarily located at the warehouse and configured to deliver packages to delivery locations outside of the warehouse, wherein each of the motorized tiles comprises a plurality of wheels configured to support a respective bin thereon, and wherein the first motorized tile is configured to receive the first bin from the first conveyor lane and move the first bin to a predefined position in the interior portion;

a transceiver configured to receive a wheel speed associated with the wheels of the first motorized tile; and a processor communicatively coupled with the first conveyor lane and the transceiver, wherein the processor is configured to:

obtain a trigger signal;

obtain the wheel speed from the transceiver responsive to obtaining the trigger signal; and activate the first conveyor lane to cause movement of the first bin from the first location to the second location at a first speed responsive to obtaining the wheel speed, wherein the first speed is based on the wheel speed.

2. The system of claim 1, wherein the transceiver receives the wheel speed from the package delivery vehicle.

3. The system of claim 1, wherein the first speed is less than or equivalent to the wheel speed.

4. The system of claim 1, wherein the first bin is configured to store a delivery package, and wherein the first location is a bin packing area at which the delivery package is placed in the first bin.

5. The system of claim 4, wherein the processor is further configured to:

obtain information associated with the first bin and the delivery package from a server; and transmit the information to the package delivery vehicle.

6. The system of claim 1, further comprising a sensor configured to detect a first bin presence in proximity to the second location.

7. The system of claim 6, wherein the sensor is disposed on the first conveyor lane in proximity to the second location.

8. The system of claim 6, wherein the processor is further configured to:

obtain inputs from the sensor;

determine the first bin presence in proximity to the second location based on the inputs; and transmit a command signal to the package delivery vehicle to cause activation of the first motorized tile, responsive to determining the first bin presence.

9. The system of claim 1, further comprising a second conveyor lane configured to move a second bin from the second location to the first location at a second speed, wherein the second speed is greater than or equivalent to the wheel speed.

10. The system of claim 1, wherein the first location is a bin staging area configured to store the first bin to be loaded in the package delivery vehicle, and wherein the bin staging area comprises a second motorized tile.

11. The system of claim 10, wherein the bin staging area is disposed in proximity to the second location.

12. The system of claim 10, wherein the first conveyor lane comprises a third motorized tile.

13. The system of claim 12, wherein the second motorized tile is configured to transport the first bin from the bin staging area to the third motorized tile, and wherein the third motorized tile is configured to receive the first bin from the second motorized tile and transport the first bin to the second location.

14. The system of claim 1, wherein the processor obtains the trigger signal when the package delivery vehicle is disposed in proximity to the first conveyor lane.

15. A method for loading bins on and unloading bins from package delivery vehicles at a warehouse, the method comprising:

obtaining, by a processor, a trigger signal;

obtaining, by the processor, a wheel speed associated with wheels of a first motorized tile of an array of motorized tiles disposed in an interior portion of a package delivery vehicle temporarily located at the warehouse and configured to deliver packages to delivery locations outside of the warehouse, wherein:

each of the motorized tiles comprises a plurality of wheels configured to support a respective bin thereon, the first motorized tile is configured to receive a first bin from a first conveyor lane and move the first bin to a predefined position in the interior portion, the first conveyor lane is configured to move the first bin from a first location to a second location, and the second location is in proximity to the first motorized tile; and activating, by the processor, the first conveyor lane to cause movement of the first bin from the first location to the second location at a first speed responsive to obtaining the wheel speed, wherein the first speed is based on the wheel speed.

16. The method of claim 15, wherein the first speed is less than or equivalent to the wheel speed.

17. The method of claim 15, wherein the first bin is configured to store a delivery package, and wherein the first location is a bin packing area at which the delivery package is placed in the first bin.

18. The method of claim 15, further comprising activating a second conveyor lane responsive to obtaining the wheel speed, wherein the second conveyor lane is configured to move a second bin from the second location to the first location at a second speed, and wherein the second speed is greater than or equivalent to the wheel speed.

19. The method of claim 15, wherein obtaining the trigger signal comprises obtaining the trigger signal when the package delivery vehicle is disposed in proximity to the first conveyor lane.

20. A non-transitory computer-readable storage medium having instructions stored thereupon which, when executed by a processor, cause the processor to:

obtain a trigger signal;

obtain a wheel speed associated with wheels of a first motorized tile of an array of motorized tiles disposed in an interior portion of a package delivery vehicle temporarily located at a warehouse and configured to deliver packages to delivery locations outside of the warehouse, wherein:

each of the motorized tiles comprises a plurality of wheels configured to support a respective bin thereon, the first motorized tile is configured to receive a first bin from a first conveyor lane and move the first bin to a predefined position in the interior portion, the first conveyor lane is configured to move the first bin from a first location to a second location, and the second location is in proximity to the first motorized tile; and activate the first conveyor lane to cause movement of the first bin from the first location to the second location at a first speed responsive to obtaining the wheel speed, wherein the first speed is based on the wheel speed.

* * * * *